April 29, 1969  F. A. BURNE  3,440,976
INFLATABLE PALLETS
Filed March 2, 1967
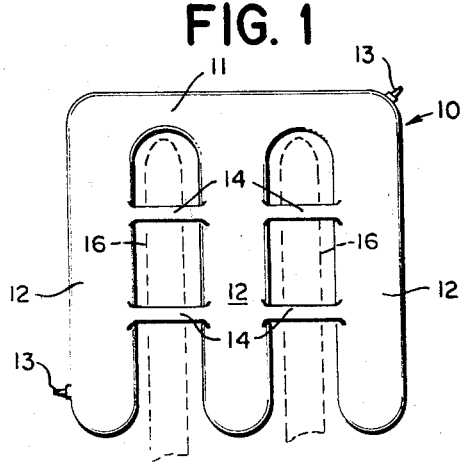
FIG. 1
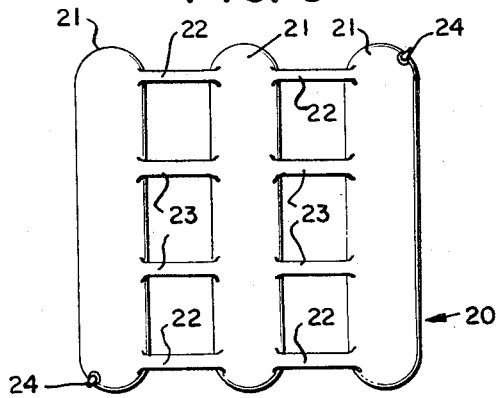
FIG. 3
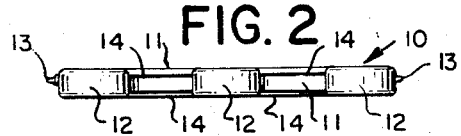
FIG. 2
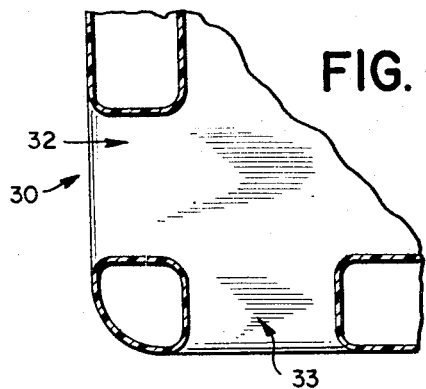
FIG. 6
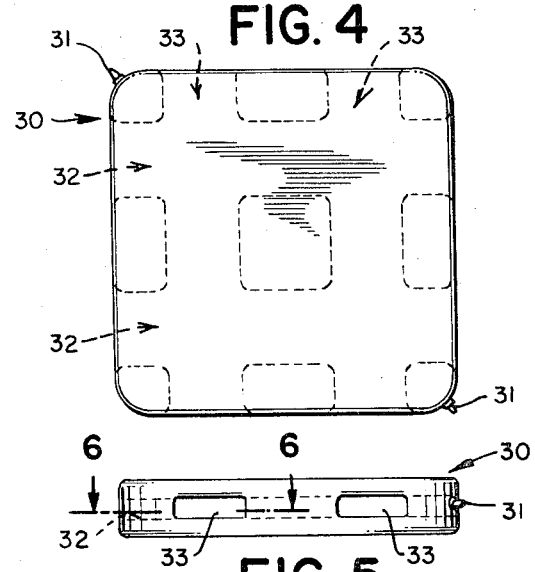
FIG. 4
FIG. 5
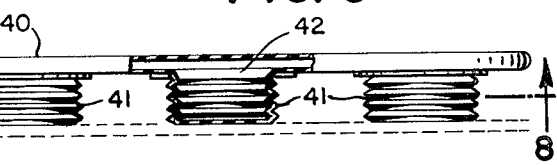
FIG. 7
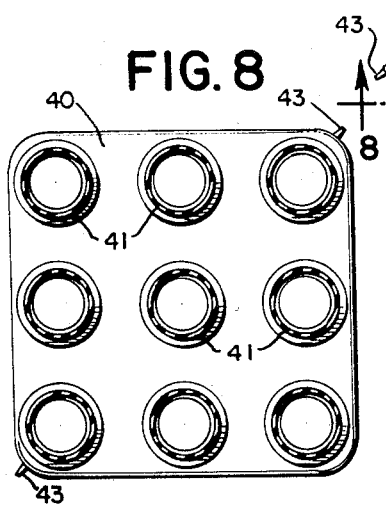
FIG. 8
INVENTOR
FREDERICK A. BURNE
BY
ATTORNEY

United States Patent Office 3,440,976
Patented Apr. 29, 1969

3,440,976
INFLATABLE PALLETS
Frederick A. Burne, Hamden, Conn., assignor to
Emery I. Valyi, Riverdale, N.Y.
Filed Mar. 2, 1967, Ser. No. 620,120
Int. Cl. B65d *19/00*
U.S. Cl. 108—51    2 Claims

ABSTRACT OF THE DISCLOSURE

An inflatable pallet for loads to be lifted by an elevator having lifting arms. The pallet includes inflatable members to be placed under the load having openings to receive the lifting arms of the elevator.

---

This invention relates to pallets for supporting loads to provide clearance for the insertion of the lifting arms of an elevator or lifting truck by which the load is to be lifted and shifted as from a warehouse into a rail car.

Such pallets are usually shifted with the load and remain with the load until the latter reaches its destination, after which the pallet must be returned to its point of origin.

An object of the present invention is to provide a pallet which can be readily and cheaply reshipped to its point of origin.

Another object is to provide a pallet which is relatively light in weight and which occupies a minimum of space when not in use.

Another object is to provide a pallet of the above type which is suitable for use with loads of various types.

In accordance with the present invention the pallet is in the form of an inflatable member such as a fabric bag or tube having a size and shape conforming to the load to be carried and having a valve in a readily accessible position through which the element can be inflated.

In the warehouse or other place where merchandise is to be stacked the pallet, in deflated state, is placed on the floor or other support and the merchandise is placed thereon. If the stack includes several units which are to be lifted separately a deflated pallet is placed below each such unit.

When a load is to be lifted and shifted the pallet is inflated from a suitable source, as from a tank of compressed air carried by the elevator or hoist. This raises the load from the floor or other support to provide clearance for the insertion of the lifting arms of the elevator. The load is thus lifted, together with the pallet, and shifted or restacked as required. If the load is restacked in a freight car or other location where head room is limited the pallet may be deflated to increase head room for stacking and then reinflated when it is to be removed from the car.

After reaching the point of destination the pallets may be deflated for easy reshipment to the point of origin.

The nature of the invention will be better understood from the following description, taken in connection with the accompanying drawing in which certain specific embodiments have been set forth for purposes of illustration, In the drawing:

FIG. 1 is a plan view of a pallet embodying the invention;

FIG. 2 is an end elevation thereof;

FIG. 3 is a plan view of a pallet illustrating a further embodiment of the invention;

FIG. 4 is a plan view of a further form of pallet;

FIG. 5 is an end elevation thereof;

FIG. 6 is a partial section taken on the line 6—6 of FIG. 5;

FIG. 7 is an end elevation partially in section of still another form of pallet; and FIG. 8 is a section taken on the line 8—8 of FIG. 7.

Referring more particularly to FIGS. 1 and 2 the pallet is shown as embodied in an inflatable unit 10 which may be made of impervious fabric such as balloon cloth and is adapted to be expanded when inflated and to be collapsed when deflated. The unit comprises a longitudinal member 11 and three spaced and parallel members 12. The members 11 and 12 communicate for inflation from a single source, shown as valves 13 which are disposed at diagonal points so as to provide ready access.

A plurality of straps 14 extend between the parallel members 12 and are attached to the top and bottom surfaces of the members 12 so as to provide clearance between the upper and lower straps when the members are inflated.

The unit 10 is made of a size corresponding to the load to be lifted. If the load comprises a box or carton which is self-supporting the unit is placed on the floor or other support and the box or carton placed directly thereon. If the load is not fully self-supporting, as in the case of a bag, a panel of similar length and width to the pallet unit 10 may be placed upon said unit 10, and the bag or the like placed on the panel.

In either case, when the load is to be lifted by an elevator or loader having lifting arms indicated as arm 16, the pallet is inflated by attaching a suitable hose to either valve member 13. The hose may be attached to a suitable source of compressed air such as a tank carried by the elevator or loader. The inflation of the unit raises the load and separates the straps 14 to provide clearance for the insertion of the lifting arm 16. When the arms are then raised the pallet and the load are raised and may be carried together to the desired point where the arms are lowered to stack and release the load. The pallet may then be deflated if head room is limited. After reaching the final destination the pallets are removed and deflated for reshipment to their point of origin.

In the embodiment of FIG. 3 the unit 20 is composed of three separate parallel members 21 joined by straps 22 at their top and bottom surfaces. Certain of the straps shown as straps 23 may be in the form of connecting tubes for the simultaneous inflation of the members. Valves 24 may be disposed at diagonal points as in the form of FIG. 1.

The use and operation of this form is the same as that above described. In this form, however, it will be noted that the lifting arms can be inserted from either side of the load in the space between the members 21.

In the embodiment of FIGS. 4 to 6 the pallet is in the form of a rectangular, pillow like member 30 having oppositely disposed inflation valves 31. The member is formed with a plurality of transverse horizontal passages 32 and a similar set of longitudinal passages 33. These passages are centrally disposed with respect to the various sides of the pallet and, when the pallet is inflated, they are caused to open and to provide clearance for the insertion of a lifting arm from any of the four sides of the load.

In the embodiment of FIGS. 7 and 8 the pallet comprises a rectangular member 40 and a plurality of bellows like members 41 which are spaced longitudinally and transversely over the surface of the member 40. In the form shown the members 41 are arranged in three rows with three such members in each row thereby providing a pair of spaced passages in both directions into which lifting arms can be inserted from any of the four sides of the load.

Each of the bellows members 41 is attached to the under surface of the retangular member 40 and is provided with a connecting opening 42 so that they are all inflatable from a single source. Valves 43 are connected to the member 40 for this purpose.

What is claimed is:

1. A pallet for supporting a load to be lifted by a lifting arm, comprising an inflatable unit composed of flexible material and adapted to be expanded when inflated and to be collapsed when deflated, said unit being of a shape and size to be positioned beneath and to support said load, said unit being composed of a plurality of spaced members, said members being connected for inflation in unison and being spaced to provide clearance for said arm, said members being joined by spaced straps beneath which said arm may be inserted for lifting said pallet and the load supported thereby in unison.

2. A pallet as set forth in claim 1 in which at least one of said straps comprises a conduit through which air passes for the inflation of said members.

References Cited

UNITED STATES PATENTS

| 2,699,310 | 1/1955 | Evans | 248—188.9 |
| 2,882,069 | 4/1959 | Faiver | 280—124 |
| 3,015,470 | 1/1962 | Patchen | 254—93 |
| 3,048,514 | 8/1962 | Bentelle et al. | 5—349 |
| 3,140,753 | 7/1964 | Bertin | 254—93 |
| 3,145,853 | 8/1964 | Langenberg. | |
| 3,192,540 | 7/1965 | Swank | 5—349 |
| 3,267,882 | 8/1966 | Rapson et al. | 108—51 |
| 3,351,027 | 11/1967 | Ellard et al. | 108—51 |

BOBBY R. GAY, *Primary Examiner.*

G. O. FINCH, *Assistant Examiner.*

U.S. Cl. X.R.

5—348